United States Patent [19]

Reamey

[11] Patent Number: 4,665,151

[45] Date of Patent: May 12, 1987

[54] PREPARING POLY (ARYLENE KETONE) WITH LIQUEFACTION AGENT TREATMENT

[75] Inventor: Robert H. Reamey, Redwood City, Calif.

[73] Assignee: Raychem Corporation, Menlo Park, Calif.

[21] Appl. No.: 659,744

[22] Filed: Oct. 11, 1984

Related U.S. Application Data

[63] Continuation-in-part of Ser. No. 594,502, Mar. 29, 1984, abandoned.

[51] Int. Cl.$^4$ .................. C08G 85/00; C08G 65/38
[52] U.S. Cl. .................. 528/126; 528/125; 528/128; 528/176; 528/179; 528/180; 528/181; 528/182; 528/193; 528/194
[58] Field of Search ............ 528/125, 126, 128, 176, 528/179–182, 193, 194

[56] References Cited

U.S. PATENT DOCUMENTS

| | | | |
|---|---|---|---|
| 3,065,205 | 11/1962 | Bonner, Jr. | 528/190 |
| 3,441,538 | 4/1969 | Marks | 260/49 |
| 3,547,906 | 12/1970 | Yale | 260/239.3 |
| 3,764,583 | 10/1973 | Newton et al. | 528/185 |
| 3,947,517 | 3/1976 | Muxfeldt et al. | 260/559 AT |
| 3,953,400 | 4/1976 | Dahl | 260/47 R |
| 4,110,314 | 8/1978 | Yagi et al. | 528/125 |
| 4,247,682 | 1/1981 | Dahl | 528/185 |
| 4,247,707 | 1/1981 | Znotins et al. | 549/22 |
| 4,251,491 | 2/1981 | Ficner | 423/185 |
| 4,260,737 | 4/1981 | Scherberg | 536/28 |
| 4,295,981 | 10/1981 | Burnop | 252/33.4 |
| 4,306,060 | 12/1981 | Ikemoto | 536/69 |
| 4,307,222 | 12/1981 | Schwab et al. | 528/125 |
| 4,308,203 | 12/1981 | Lin | 260/124 |
| 4,325,878 | 4/1982 | McCombs | 260/397.1 |
| 4,470,929 | 9/1984 | Ligon | 260/465 D |

FOREIGN PATENT DOCUMENTS 971227 9/1964 United Kingdom .

OTHER PUBLICATIONS

The Condensed Chemical Dictionary, 8th Edition, p. 589.
Hackh's Chemical Dictionary, 4th Edition, pp. 432–433.
Webster's New Collegiate Dictionary, p. 779 (1977).
"Practical Organic Chemistry" by Vogel, pp. 730–731.

Primary Examiner—Harold D. Anderson
Attorney, Agent, or Firm—Edith A. Rice; Yuan Chao; Herbert G. Burkard

[57] ABSTRACT

The preparation of poly(arylene ketones) and in particular all para-linked poly(arylene ether ketones) by Friedel-Crafts polymerization in the presence of a Lewis acid generally results in an intractible reaction product difficult to remove from the reaction vessel and difficult to purify. The addition of a liquefaction agent, such as a hydrogen halide and in particular hydrogen chloride, to the reaction mixture, results in a tractible gel or a liquid which can be readily handled. The hydrogen halide is preferably under pressure and a diluent may also be added along with the hydrogen halide.

17 Claims, No Drawings

PREPARING POLY (ARYLENE KETONE) WITH LIQUEFACTION AGENT TREATMENT

This application is a continuation-in-part of application Ser. No., 594,502, filed March 29, 1984, now abandoned, the disclosure of which is incorporated herein by reference.

Background of the Invention

This invention relates to a method of preparing a poly(arylene ketone) and, in particular, to a method of liquefying the reaction mixture to provide a liquid or a tractable gel from which the polymer can be isolated and purified.

Poly(arylene ketones), in particular, para-linked poly(arylene ether ketones), possess many desirable properties, for example, high temperature stability, mechanical strength, and resistance towards common solvents. The preparation of poly(arylene ether ketones) by two different approaches has been described in the literature. The first approach is an electrophilic synthesis in which an aryl ketone linkage is formed. The second is a nucleophilic synthesis in which an aryl ether linkage is formed. This invention is directed to an electrophilic synthesis for preparing poly(arylene ketones) in particular para-linked poly(arylene ether ketones).

In an electrophilic synthesis, the polymerization step involves the formation of an aryl ketone group derived by the reaction between an aromatic acid halide functional group and an activated hydrogen atom attached to an aromatic carbon atom, i.e. a hydrogen atom displaceable under the electrophilic reaction conditions. The monomer system employed in the polymerization can be, for example, (a) phosgene or an aromatic diacid dihalide and a polynuclear aromatic compound containing two activated hydrogen atoms, for example, terephthaloyl chloride and 1,4-diphenoxybenzene; or (b) a polynuclear aromatic compound containing both an acid halide group and an activated hydrogen atom, for example, p-phenoxybenzoyl chloride.

Electrophilic polymerizations of this type are often referred to as Friedel-Crafts polymerizations. Typically, such polymerizations are carried out in a reaction medium comprising the reactant(s), a catalyst, such as anhydrous aluminum trichloride, and an inert solvent such as methylene chloride. Because the carbonyl groups of the reactant(s) complex with aluminum trichloride and thereby deactivate it, the aluminum trichloride catalyst is generally employed in an amount slightly more than one equivalent for each equivalent of carbonyl groups in the reaction medium. Other metal halides such as ferric chloride may be employed as the catalyst. U.S. Pat. Nos. 3,065,205 to Bonner, 3,516,966 to Barr, 4,008,203 to Jones and U.K. Pat. Nos. 971,227 and 1,086,021 both to Imperial Chemical Industries, Limited, disclose the preparation of poly(arylene ketones) by Friedel-Crafts polymerization.

The polymers as initially produced by these processes are generally relatively intractable and difficult to isolate and to purify. U.S. Pat. No. 3,791,890 to Gander et al. addresses this problem and discloses a process which permits the preparation of polyketones in granular form. The process described by Gander et al. comprises bringing into contact, in an organic medium, diphenyl ether and a stoichiometric amount of at least one compound selected from terephthalic and isophthalic acid chlorides with aluminum chloride catalyst and completing the reaction by abruptly dispersing the reaction mixture into a higher temperature fluid maintained at a temperature of about from 50° C. to 130° C., to effect an abrupt rise in temperature, the volume of said fluid being at least 200 percent of the initial volume of the reaction mixture, the reaction mixture being dispersed (a) prior to coagulation of the mixture; and (b) after the elapse of at least 25 percent of the time period between the completion of the combination of reactants, including catalyst, and coagulation of the reaction mixture. This process requires critical timing as the reaction mixture must be dispersed before gelation occurs. Further, the process subjects the reaction mixture to relatively high temperatures, thereby increasing the possibility of side reactions. The resulting product is granular and may entrap catalyst residues making purification more difficult.

Another solution to the problem of intractable polymer formation is the use of boron trifluoride catalyst in anhydrous hydrogen fluoride. See for example, U.S. Pat. Nos. 3,441,538 to Marks, 3,442,857 to Thornton, 3,953,400 to Dahl, and 3,956,240 to Dahl et al. The resulting polymer-catalyst complex is soluble in the hydrogen fluoride/boron trifluoride reaction medium. Recovery of the polymer from this reaction mixture and decomplexation of the polymer-catalyst complex while in solution are disclosed in U.S. Pat. Nos. 3,751,398 and 4,239,884 both to Dahl. However, the use of boron trifluoride and hydrogen fluoride requires special techniques and equipment making this process difficult to practice on a commercial scale.

It would thus be desirable to be able to produce a poly(arylene ketone) in a form which is readily isolated and purified without the disadvantages of the prior art attempts to produce such polymers in other than an intractable mass.

SUMMARY OF THE INVENTION

I have now discovered that if, in the preparation of a poly (arylene ketone) by Friedel-Crafts polymerization, the reaction mixture is treated with a liquefaction agent which can be a hydrogen halide such as anhydrous hydrogen chloride, a tractable gel or a liquid reaction product is obtained. In addition to the liquefaction agent a nonprotic diluent, for example the same diluent as used in the reaction medium, can be added. The reaction mixture can be treated with the liquefaction agent at any point during the reaction from the step of monomer addition to after an intractable gel has formed.

One aspect of this invention comprises a method of preparing a poly(arylene ketone) which comprises:

(I) forming a reaction mixture comprising:

(a) a monomer system comprising (i) (aa) phosgene or an aromatic diacid dihalide and a (bb) polynuclear aromatic comonomer or (ii) a polynuclear aromatic acid halide;

(b) a Lewis acid in an amount of about one equivalent per equivalent of carbonyl groups in the monomer system plus an amount effective to act as a catalyst for the polymerization; and (c) a non-protic diluent in an amount from 7 to about 93% by weight, based on the weight of the total reaction mixture, (II) permitting polymerization to continue until a polymer of the desired molecular weight has been obtained;

(III) treating the reaction mixture with a liquefaction agent; and (IV) recovering and purifying the polymer.

Another aspect of this invention comprises a method of preparing a poly(arylene ketone) which comprises:

(I) forming a reaction mixture comprising:

(a) a monomer system comprising (i) (aa) phosgene or an aromatic diacid dihalide and (bb) a polynuclear aromatic comonomer or (ii) a polynuclear aromatic acid halide;

(b) a Lewis acid in an amount of about one equivalent per equivalent of carbonyl groups in the monomer system, plus about one equivalent per equivalent of Lewis base, plus an amount effective to act as a catalyst for the polymerization;

(c) a Lewis base in an amount from 0.01 to about 4 equivalents per equivalent of acid halide groups present in the monomer; and (d) a non-protic diluent in an amount from 0 to about 93% by weight, based on the weight of the total reaction mixture, (II) permitting polymerization to continue until a polymer of the desired molecular weight has been obtained;

(III) treating the reaction mixture with a liquefaction agent; and (IV) recovering and purifying the polymer.

The liquefaction agent can be added at any stage of the polymerization reaction, that is, steps II and III can be carried out simultaneously, if desired. Treatment of the reaction mixture in this manner results in a tractable gel or a liquid. It has been found that treatment of the reaction mixture with the liquefaction agent even after formation of an intractable gel renders the gel more tractable and in some instances liquefies the reaction mixture.

DETAILED DESCRIPTION OF THE INVENTION

The polymers produced by the process of the invention are poly(arylene ketones) and in particular poly(arylene ether ketones) having repeat units of the general formula

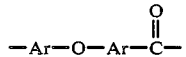

wherein each Ar is independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. Linking groups which can join aromatic rings in the aromatic moieties include for example, carbonyl, sulfone, ether, sulfide, amide, imide, azo, alkylene, perfluoroalkylene and the like.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-aralkenyl, alkynyl and the like.

Monomer systems useful in the polymerization reaction of this invention are well known in the art. Such monomer systems comprise a diacid dihalide and a polynuclear aromatic comonomer or a polynuclear aromatic acid halide. Illustrative monomer systems of this type are described in U.S. Pat. Nos. 3,441,538 to Marks, 3,442,857 to Thornton, 3,953,400 to Dahl and 3,956,240 to Dahl et al, the disclosures of which are incorporated herein by reference.

Preferred monomer systems include for example, diphenyl ether and terephthaloyl and/ or isophthaloyl chloride; bisphenoxy-benzene and terephthaloyl chloride; bisphenoxy benzophenone and terephthaloyl chloride; diphenyl ether and phosgene; bisphenoxybenzophenone and phosgene; phenoxybenzoyl chloride, phenoxyphenoxybenzoyl chloride, and the like.

As discussed above, the poly(arylene ketones) can be produced by Friedel-Crafts polymerization. Typically aluminum trichloride is used as the catalyst and the reaction medium can contain a diluent. As the molecular weight of the polymer increases in such a polymerization, the reaction medium becomes viscous and generally a gel forms. The nature of the gel varies depending on the monomers employed and the reaction conditions. In some instances the gel is a relatively stiff gel and in others it is a solid intractable mass. In either event the polymer is usually difficult to isolate from the reaction mixture and to purify, particularly in commercial scale processes. An improved method for Friedel-Crafts synthesis of poly (arylene ether ketones) is described and claimed in commonly assigned copending application Ser. No. 594,503, filed March 29, 1984 of Jansons et al. which is a continuation-in-part of application Ser. No. 481,083 filed Mar. 31, 1983, now abandoned, the disclosure of which applications are incorporated herein by reference. In the improved process disclosed in that application, the polymerization is controlled by the addition of a controlling agent, preferably a Lewis base, or by adjusting the relative amounts of monomer, Lewis acid catalyst and non-protic diluent, if present, or both.

In such Friedel-Crafts polymerization processes, a Lewis acid is present in an amount of at least about one equivalent per equivalent of carbonyl groups present in the monomer plus about one equivalent per equivalent of Lewis base, plus an amount effective to act as a catalyst for the polymerization. Generally the amount added as catalyst should be from about 0.05 to about 0.3 equivalents of Lewis acid per equivalent of acid halide groups in the monomer system. Greater amounts can be used, if desired. If a comonomer containing additional basic groups is present in the monomer system, additional Lewis acid may be needed.

The term "Lewis acid" is used herein to refer to a substance which can accept an unshared electron pair from another molecule. Lewis acids which can be used in the practice of this invention include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. The use of substantially anhydrous aluminum trichloride as the Lewis acid is preferred.

A non-protic diluent in an amount of up to 93% by weight, based on the weight of the total reaction mixture, can also be employed, if desired. Typically the diluent is used in an amount of at least about 7%, preferably at least about 20% by weight, based on the weight of the total reaction mixture. It should be relatively inert toward Friedel-Crafts reactions. The diluent is preferably somewhat polar as measured by its dielectric constant and solubility parameter. Preferably the dielectric constant of the diluent is at least about 2.5 at 24° C., and preferably in the range of from about 4.0 to about 25 at 24° C. The Hildebrand solubility parameter of the diluent is preferably at least about 7.2 $[cal/cm_3]^{178}$ and is preferably in the range of from about 9.2 to about 15 $[cal/cm_3]^{178}$. Preferred diluents include, for example, methylene chloride, carbon disulfide, o-dichlorobenzene, 1,2,4-trichlorobenzene, o-difluorobenzene, 1,2-dichloroethane, 1,1,2,2-tetrachloroethane and mixtures thereof.

When a Lewis base is employed as a controlling agent for the polymerization, the Lewis base is used in an amount from 0 to about 4 equivalents per equivalent of acid halide groups present in the monomer system. Amounts greater than about 4 equivalents could be employed, if desired. However, no additional controlling effect is usually achieved by adding larger amounts. Thus, it is preferred to use no more than about 4 and generally no more than about 2 equivalents. When a Lewis base is added to the reaction mixture, at least about 0.01, preferably at least about 0.05 and most preferably at least about 0.5 equivalents of Lewis base per equivalent of acid halide groups present should be used. The particular amount of Lewis base added depends to a certain extent on the nature of the monomers present. A nonprotic diluent need not be used when a Lewis base is present in the reaction medium. The Lewis base generally forms a complex with the Lewis acid, which complex may be a liquid and act as a diluent or solvent in the reaction medium.

The term "Lewis base" is used herein to refer to a substance capable of donating an unshared electron pair to a Lewis acid. Thus, the Lewis base forms a complex with the Lewis acid used in the reaction medium. It has been found that Lewis bases which form a 1:1 complex having a heat of association at least that of diphenyl ether with the Lewis acid are preferred. For example, where aluminum trichloride is the Lewis acid the Lewis base used should form a 1:1 complex having a heat association of at least about 15 kcal/mole, preferably at least about 20 kcal/mole and most preferably at least about 30 kcal/mole. While the heats of association are for a 1:1 Lewis acid/Lewis base complex consisting solely of these two components, the actual complex formed in the reaction medium need not be a 1:1 complex. A discussion on heats of association for Lewis acid/Lewis base complexes is found in J. Chem Soc. (A), 1971, pages 3132-3135 (D. E. H. Jones et al). The Lewis base used should not be an acylating, alkylating or arylating agent nor should it be acylatable under the reaction conditions. Mixtures of two or more Lewis bases can be used, if desired.

Organic and inorganic Lewis bases can be used. Examples of organic Lewis bases are N,N-dimethylformamide, diphenyl sulfone, n-butyronitrile, and the like. Inorganic Lewis bases which can be used include, for example, chlorides, perchlorates, and the like, particularly sodium or lithium chloride.

The reaction is conducted at temperatures in the range of from about −50° C. to about +150° C. It is preferred to start the reaction at lower temperatures, for example at about −50° C. to about −10° C. After polymerization has commenced the temperature can be raised, for example up to about 150° C. and even higher, if desired, for example to increase the rate of reaction. It is generally preferred to carry out the reaction at temperatures in the range of between about −30° C. and +25° C. (room temperature).

The polymerization is permitted to continue until a polymer having the desired molecular weight is obtained. For many uses poly(arylene ketones) high molecular weight polymer is required.

By "high molecular weight" is meant polymer having an inherent viscosity greater than 0.6. Preferably the polymer prepared by the process of this invention has an inherent viscosity in the range of about 0.6 to about 1.7. Polymers having an inherent viscosity below about 0.6 are generally not useful because they have poor mechanical properties, such as tensile strength and elongation. They also tend to be brittle while polymers having an inherent viscosity above about 1.7 are very difficult to melt process. Throughout this application, inherent viscosity refers to the mean inherent viscosity determined according to the method of Sorenson et al, "Preparative Methods of Polymer Chemistry" Interscience (1968), at page 44 [0.1 g polymer dissolved in 100 ml of concentrated sulfuric acid at 25° C.].

As mentioned above, the polymerization typically results in a relatively intractable gel or a precipitated intractable mass which is difficult to remove from the reaction vessel. On a laboratory scale, the flask, or similar glass vessel, can be broken to obtain the polymer gel. On a commercial scale, removal of the gel from the reaction vessel, in some instances, cannot be accomplished in a practical manner. This invention is directed to a method of producing a poly(arylene ketone) by Friedel-Crafts polymerization in a manner so as to yield a reaction product in the form of a tractable gel or a liquid which can readily be discharged from the reaction vessel. In accordance with this invention, the reaction mixture is treated with a liquefaction agent. The liquefaction agent can be a hydrogen halide. Anhydrous hydrogen chloride is particularly preferred.

The amount of liquefaction agent used to treat reaction mixture is at least about 0.2 equivalents liquefaction agent per equivalent of carbonyl groups in the monomer system. Preferably the amount used is from about 0.5 to about 20, and most preferably from about 1.0 to about 10, equivalents of liquefaction agent per equivalent of carbonyl groups in the monomer system. The amount of liquefaction agent used refers to the amount of that agent added to the mixture and does not include amounts of such agent formed in situ during the polymerization reaction.

Treatment with a liquefaction agent, such as hydrogen chloride, which is a gas at the reaction temperature is accomplished by introducing the agent into the reaction vessel and providing a pressure of between about 1.2 atmospheres to about 40 atmospheres (gauge), preferably from about 2 to about 20 atmospheres and most preferably from about 4 to about 15 atmospheres. Sufficient pressure to cause condensation of gaseous hydrogen chloride has been found to be desirable to liquefy particularly intractable gels.

Treatment with the liquefaction agent can take place at any stage of the polymerization reaction from the step of monomer addition to completion of the polymerization. In certain instances, the reaction medium tends to gel before complete addition of the last component, generally the monomers or the catalyst, to the reaction medium. The presence of the liquefaction agent at this stage prevents such gelation and permits adequate mixing of the components. It has also been found that even if the polymerization has proceeded to form high molecular weight polymer in the form of a relatively intractable mass, addition of the liquefaction agent results in a soft or tractable gel or a liquid.

In some instances addition of non-protic diluent as well as the liquefaction agent is advantageous. The presence of this diluent further softens the gel improving its tractability or produces a liquid phase. Preferred nonprotic diluents that can be used are those described above for use as a diluent in the reaction medium. The diluent may, but need not be, the same diluent used in the reaction medium. The amount of diluent added should be sufficient to provide a reaction medium containing polymer in an amount of about 5%, preferably 10%, by weight (calculated as the monomer) based on the weight of the final mixture. The diluent can, if desired, be added simultaneously with the liquefaction agent.

While applicant does not wish to be bound by any theory, it is believed that liquefaction of the reaction mixture is due to the action of the liquefaction agent in severing links formed by aluminum chloride-carbonyl complexes bridging adjacent polymer chains.

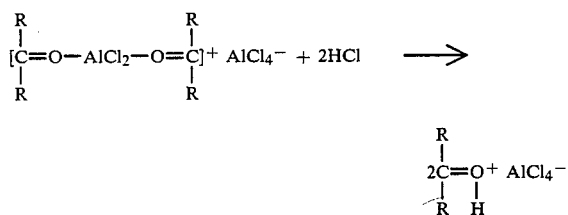

(wherein R refers to polymer chain)

The liquefaction agent causes the reaction mixture to form a relatively soft tractable gel or a viscous liquid in the reaction medium. In either event, the reaction mixture is said to be liquefied. The reaction mixture can then be more readily removed from the reaction vessel for purification, for example, by extrusion through an opening in the bottom of the reaction vessel. When the liquefaction agent is a gas, such as hydrogen chloride, maintained under pressure in the reaction vessel, the reaction mixture forms a soft foam as it is removed from the reaction vessel. The foam has a high surface to volume ratio which facilitates catalyst removal. As is well known, the Lewis acid catalyst complexes with the carbonyl groups in the polymer chain. If the catalyst is not removed from the polymer, the polymer tends to cross link at elevated temperatures, i.e. is melt unstable. Poly(arylene ketones) are thermoplastic materials having relatively high melting points. Therefore, to be melt processable by conventional techniques the polymer should be able to withstand the temperature required for melt processing for a period of time. Typically these conditions require that the polymer can withstand temperatures up to about 30° C. above the melting point of the polymer for periods of at least 30 minutes, preferably at least 60 minutes and most preferably at least 90 minutes, without undesired gel formation or change in inherent viscosity. This makes removal of catalyst from the catalyst-polymer complex very important.

Decomplexation can be accomplished by treating the polymerization reaction mixture with a decomplexing agent after completion of polymerization. The decomplexing agent must be at least as basic towards the Lewis acid as the basic groups on the polymer chain. The amount of decomplexing base used should be in excess of the total amount of bound (complexed) and unbound Lewis acid present in the reaction mixture and is preferably at least twice the total amount of Lewis acid. Typical decomplexing agents which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulfide, tetramethylenesulfone, benzophenone, tetramethyl-ammonium chloride, isopropanol and the like. The decomplexed polymer can then be recovered by conventional techniques such as adding a nonsolvent for the polymer which is a solvent for or miscible with the rest of the reaction mixture including the base-catalyst complex; spraying the reaction medium into a non-solvent for the polymer; separating the polymer by filtration; or evaporating the volatiles from the reaction medium and then washing with an appropriate solvent to remove any remaining base/catalyst complex from the polymer. The following examples illustrate the process of this invention.

EXAMPLE 1

A nitrogen-purged BEP 280 reactor (Buchi A.G., Uster, Switzerland) was charged with aluminum chloride (203.9 g, 1.53 mol), lithium chloride (32.41 g, 0.764 mol) and 1,2-dichloroethane (215 ml). This slurry was cooled to $-10°$ C. and p-phenoxybenzoyl chloride (118.6 g., 0.510 mol) containing p-phenoxybenzophenone (0.698 g, 0.0025 mol) and benzoyl chloride (0.430 g, 0.0031 mol) as capping agents was added. The reaction was allowed to proceed for 1 hour at $-10°$ C. and about 22 hours at 0° C., at the end of which time the reaction mixture was a thick, hard-to-stir gel.

The reactor was pressurized to 5 atm with hydrochloric acid gas from a lecture bottle. The gel became easier to stir within 20 minutes and was converted into a viscous liquid within 2 hours. No further changes in the appearance of the reaction mixture were noted during the next hour.

The reaction mixture was extruded through the discharge port at the bottom of the reactor into cold water, blended, and collected by filtration. The isolated polymer was purified by (1) washing and blending in methanol and filtering; (2) digesting in methanol at about 50° C. for 24 hours followed by filtration and washing with water; (3) consecutive 24 hour digestions in water at 70° C., 85° C. and 100° C., with a filtration and water wash between each digestion; and (4) drying in a vacuum oven at 150° C. for 16 hours.

The inherent viscosity of the polymer obtained was 0.94, and that of a 30 min/400° C. slab was 0.97.

The amount of hydrogen chloride taken up during the liquefaction process was calculated by weighing the lecture bottle before and after the process and adjusting for the hydrochloric acid in the gas phase above the reaction mixture by assuming the ideal gas law. According to these calculations, 1.5–2 mol of hydrochloric acid was taken up per mole of monomer.

EXAMPLE 2

The reactor of example 1 was charged with aluminum chloride (99.8 g, 0.75 mol) and cold (-20° C.) 1,2-dichloroethane (153 mL). The reactor was cooled to $-15°$ C. and p-phenoxybenzoyl chloride (58.17 g, 0.25 mol) containing p-phenoxybenzophenone (0.308 g, 0.0011 mol) as capping agent was added over 8 minutes. The reactor was pressurized to 4 atm with hydrochloric acid gas and the reactor was sealed off. After 1 hour, the temperature of the reactor was raised to 0° C. and kept there for another 22.5 hours. At this point, the reaction mixture was a viscous liquid containing some suspended white particles, presumably undissolved aluminum chloride, and the pressure was about 2.6 atm.

The reaction was worked up as described in Example 1, except that the first blend was in 6% aqueous hydrochloric acid.

The inherent viscosity of the polymer obtained was 0.76, and that of a 30 min/400° C. slab pressed from it was 0.78.

The amount of hydrogen chloride taken up during the reaction corresponded to 2 mol per mole of monomer.

The corresponding reaction run without the hydrogen chloride overpressure gave a rock-hard mass.

EXAMPLE 3

The reactor of Example 1 was charged with aluminum chloride (101.9 g, 0.764 mol), lithium chloride (16.2 g, 0.382 mol), and o-dichlorobenzene (200 mL). The reactor was cooled to −10° C. and p-phenoxybenzoyl chloride (59.3 g, 0.255 mol) containing p-phenoxybenzophenone (0.262 g, 0.0010 mol) and benzoyl chloride (0.161 g, 0.0011 mol) as capping agents was added over 15 minutes. The reaction was allowed to proceed at 0° C. for 16 hours and then at 20° C. for 6 hours. A tough, yellow-orange mass separated and adhered to the stirrer. About 20% of the reaction volume was a fluid phase, apparently mostly excluded solvent. The reactor was then pressurized to 4-6 atm with hydrogen chloride gas. After one hour, the mass softened to the consistency of a thick paste and began depositing on the walls of the reactor. (Lowering the temperature to 0° C. at this point had no visible effect.) After 3 hours, the pressure was vented and 1,2-dichloroethane (200 mL) was added. The reactor was then re-pressurized to about 4 atm with hydrogen chloride and the contents were stirred for 1 hour. The fluid, excluded solvent phase was removed via the discharge port, more 1,2-dichloroethane (200 mL) was added, and the reactor was re-pressurized to about 4 atm with hydrogen chloride for another 15 hr at 0° C. At the end of this period, there were still two phases, but the polymer-containing phase was soft and could easily be extruded through the discharge port.

The polymer was isolated by blending the extrudate in cold (−40° C.) N,N-dimethylformamide (DMF), filtering, and washing with more DMF. It was purified by digestion in DMF (50° C., overnight) and water (twice, 60° C., 1 hr each), followed by drying in a vacuum oven (165° C., overnight).

The inherent viscosity of the polymer was 1.07, and that of a 30 min/400° C. slab was 0.98.

EXAMPLE 4

The reactor of Example 1 was charged with aluminum chloride (50.0 g, 0.375 mol), lithium chloride (7.95 g, 0.1875 mol), and o-dichlorobenzene (51 mL). The reactor was cooled to −10° C. and p-phenoxybenzoyl chloride (29.05 g, 0.125 mol), containing p-phenoxybenzophenone (0.154 g, 0.000561 mol) as a capping agent was added over 15 minutes. The reactor was then pressurized with 5 atm hydrogen chloride gas. The reaction was allowed to proceed at 0° C. for 20 hours. As the reaction proceeded, a yellow taffy-like material was deposited on the walls of the reactor leaving some excluded solvent. The HCl pressure was raised to about 25 atm and several hundred ml of HCl condensed into the reactor. The taffy-like material softened, no longer adhered to the walls and formed a two-phase system with the remainder of the reaction mixture. The top phase was a clear yellow liquid and the bottom phase was an opaque whitish-yellow viscous fluid which was easily extruded from the reactor.

EXAMPLE 5

To a nitrogen purged reactor of Example 1 was added aluminum chloride (200 g, 1.5 mole), lithium chloride (31.8 g, 0.75 mole), and 1,2-dichloroethane (210 mL). The temperature of the reactor was lowered to −15° C. and p-phenoxybenzoylchloride (116.3 g, 0.5 mole) containing p-phenoxybenzophenone (0.617 g, 0.00225 mole) was added over 10 min. The reactor was pressurized to 2 atm with hydrogen chloride gas and the temperature was raised to 0° C. After 2 hours the HCl pressure was raised to 3 atm. The reaction mixture remained a viscous liquid throughout the polymerization. A portion of the reaction was removed 23 hours after the completion of monomer addition. The polymer was worked up as described in Example 2. The inherent viscosity of the powder was 1.14. The inherent viscosity of a 30 min. slab (400° C.) was 1.12.

EXAMPLE 6

The reaction was started as described in Example 5. Upon completion of monomer addition, the reactor was pressurized to 3 atm with hydrogen chloride gas and the temperature was taken to 0° C. After 2 hours the temperature was raised to 0° C. and the pressure was raised to 7 atm. (The higher pressure is necessary to keep the system fluid at 20° C.) A portion of the reaction mixture was removed 8 hours after the completion of monomer addition. The polymer was worked up as described in Example 2. The inherent viscosity of the polymer was 1.04 and that of a 30 min/400° C. slab was 0.83.

EXAMPLE 7

The reactor of Example 1 was charged with aluminum chloride (50.0 g, 0.375 mol), lithium chloride (7.95 g, 0.1875 mol), and 1,1,2,2-tetrachloroethane (41.3 mL). The reactor was cooled to −5° C. and p-phenoxybenzoyl chloride (29.05 g, 0.125 mol) containing p-phenoxybenzophenone (0.154 g, 0.000561 mol) as a capping agent was added over 15 minutes. The reaction was allowed to proceed at 0° C. under nitrogen for 15 hours. A tough, rubbery, reddish gel was produced. The reactor was then pressurized to 11 atm with hydrogen chloride gas to liquefy the gel. The gel was extruded easily from the reactor.

EXAMPLE 8

The reactor of Example 1 was charged with aluminum chloride (50.0 g, 0.375 mol), lithium chloride (7.95 g, 0.1875 mol), and carbon disulfide (200 mL). The reactor was cooled to −10° C. and p-phenoxybenzoyl chloride (29.05 g, 0.125 mol) containing p-phenoxybenzophenone (0.154 g, 0.000561 mol) was added over 15 minutes. The reactor was pressurized with 10 atm hydrogen chloride gas. The reaction was allowed to proceed at 0° C. for 22 hours. The HCl pressure was then raised to 28 atm and about 100 ml liquid hydrogen chloride condensed into the reaction mixture. The yellow-orange gel softened.

EXAMPLE 9

The reactor of Example 1 was charged with aluminum chloride (50.0 g, 0.375 mol), n-butyronitrile (9.95 g, 0.144 mol), and 1,2-dichloroethane (66.4 mL). The reactor was cooled to −5° C. and p-phenoxybenzoyl chloride (29.05 g, 0.125 mol) containing p-phenoxybenzophenone (0.154 g, 0.000561 mol) was added over 15 minutes. The reaction was allowed to proceed at 10° C. for 19 hours. A stiff gel formed. The reactor was then pressurized to 8-9 atm with hydrogen chloride gas to liquefy the gel.

EXAMPLE 10

The reactor of Example 1 was charged with aluminum chloride (280 g, 2.10 mol), lithium chloride (42.4 g, 1.00 mol) and 1,2-dichloroethane (382 mL). The reactor was cooled to −17° C. and a mixture of terephthaloyl chloride (101.5 g, 0.50 mol), 1,4-diphenoxybenzene (132.2 g, 0.504 mol), benzoyl chloride (1.124 g, 0.008 mol), and 1,2-dichloroethane (150 mL) was added over 32 min. The temperature was raised to 0° C. and the reaction was allowed to proceed for 6 hours. The tough gel was liquefied with 10 atm of HCl. The reaction mixture was extruded into a blender containing aqueous 10% HCl, blended, washed, blended in methanol, washed, heated in methanol for 15 hours, washed with distilled water and dried in a vacuum oven at 165° C. The resulting polymer had an inherent viscosity of 1.2 dl/g.

EXAMPLE 11

The reactor of Example 1 was charged with aluminum chloride (44.71 g, 0.3353 mol), lithium chloride (4.514 g, 0.1065 mol), and 1,2-dichloroethane (103 mL). The reactor was cooled to −19° C. and 5 atm of HCl was added. A mixture of terephthaloyl chloride (21.61 g, 0.1065 mol), 1,4-diphenoxybenzophenone (28.15 g, 0.1073 mol), benzoyl chloride (0.2393 g, 0.0017 mol), and 1,2-dichloroethane (48 mL) was added over 15 min. The HCl pressure during monomer addition was necessary to keep the system liquid throughout the addition. The monomers were rinsed in with 20 mL of 1,2-dichloroethane. The temperature was raised to 0° C. and the HCl pressure was raised to 8 atm. After 6 hours the fluid reaction mixture was discharged and worked up as described in Example 10. The inherent viscosity of the isolated polymer was 1.04 dl/g.

EXAMPLE 12

The reactor of Example 1 was charged with aluminum bromide (50.0 g, 0.1875 mol), lithium bromide (8.14 g, 0.0937 mol), and 1,2-dichloroethane (26.3 mL). The reactor was cooled to −15° C., and a mixture of p-phenoxybenzoylchloride (14.54 g, 0:0625 mol) and p-phenoxybenzophenone (0.0771 g, 0.00281 mol) was added over 20 minutes. The temperature of the reactor was raised to 0° C. After 22 hours the gel that formed was treated with 7 atm of HCl. This treatment resulted in the liquefaction fo the gel, which could be discharged from the reactor through the bottom valve.

EXAMPLE 13

The reaction of Example 7 was repeated with methylene chloride replacing 1,1,2,2-tetrachloroethane as diluent. After 17 hours at 0° C. the reaction mixture had become a thick light orange mass. The reactor was pressurized with 10 atm of HCl, causing the reaction mixture to become a liquid with the consistency of honey.

example 14

The reactor of Example 1 was charged with aluminum chloride (50.0 g, 0.375 mol), lithium chloride (7.95 g, 0.1875 mol), and 1,2-dichloroethane (52.5 mL). The reactor was cooled to −15° C. and a mixture of p-phenoxybenzoyl chloride (29.05 g, 0.125 mol), and p-phenoxybenzophenone (0.154 g, 0.000561 mol) was added over 4 min. The temperature of the reactor was raised to 0° C. After 21 h, the hard lump which had formed was treated with 5 atm of HCl gas, resulting in the liquefaction of the reaction medium.

While the invention has been described herein in accordance with certain preferred embodiments thereof, many modifications and changes will be apparent to those skilled in the art. Accordingly, it is intended by the appended claims to cover all such modifications and changes as fall within the true spirit and scope of the invention.

I claim:
1. A method of preparing a poly(arylene ketone) which comprises:
   (I) forming a reaction mixture comprising:
      (a) a monomer system comprising (i) (aa) phosgene or an aromatic diacid halide and (bb) a polynuclear aromatic comonomer or (ii) a polynuclear aromatic acid halide;
      (b) a Lewis acid in an amount of at least one equivalent per equivalent of carbonyl groups in the monomer system plus an amount effective to act as a catalyst for the polymerization; and
      (c) a non-protic diluent in an amount from about 7 to about 93% by weight, based on the weight of the total reaction mixture,
   (II) permitting polymerization to continue until a polymeric reaction mixture containing polymer of the desired molecular weight has been obtained;
   (III) treating the polymeric reaction mixture with a hydrogen halide liquefaction agent in an amount of at least about 0.2 equivalents liquefaction agent per equivalent of carbonyl groups in the monomer system; and
   (IV) recovering and purifying the polymer.
2. A method in accordance with Claim 1 wherein the liquefaction agent is anhydrous hydrogen chloride.
3. A method in accordance with Claim 1 wherein steps II and III are carried out simultaneously.
4. A method in accordance with Claim 3, wherein the liquefaction agent is anhydrous hydrogen chloride.
5. A method in accordance with Claim 3 wherein the step of treating the reaction mixture with the liquefaction agent is carried out under a pressure between about 1.2 to about 40 atmospheres.
6. A method in accordance with Claim 1 which further comprises the step of adding a non-protic diluent as well as a liquefaction agent in step III.
7. A method in accordance with Claim 6 wherein the nonprotic diluent is 1,2-dichloroethane.
8. A method in accordance with Claim 1 which further comprises the step of removing catalyst residues by treating the reaction mixture with a decomplexing agent.
9. A method of preparing a poly(arylene ketone) which comprises:
   (I) forming a reaction mixture comprising:

(a) a monomer system comprising (i) (aa) phosgene or an aromatic diacid halide and (bb) a polynuclear aromatic comonomer or (ii) a polynuclear aromatic acid halide;

(b) a Lewis base in an amount from 0.01 to about 4 equivalents per equivalent of acid halide groups present in the monomer system;

(c) a Lewis acid in an amount of at least one equivalent per equivalent of carbonyl groups in the monomer system, plus about one equivalent per equivalent of Lewis base, plus an amount effective to act as a catalyst for the polymerization; and (d) a non-protic diluent in an amount from 0 to about 93% by weight, based on the weight of the total reaction mixture, (II) permitting polymerization to continue until a polymeric reaction mixture containing polymer of the desired molecular weight has been obtained;

(III) treating the polymeric reaction mixture with a hydrogen halide liquefaction agent in an amount of at least about 0.2 equivalents liquefaction agent per equivalent of carbonyl groups in the monomer system; and (IV) recovering and purifying the polymer.

10. A method in accordance with Claim 9 wherein the liquefaction agent is anhydrous hydrogen chloride.

11. A method in accordance with Claim 9 wherein steps II and III are carried out simultaneously.

12. A method in accordance with Claim 11, wherein the liquefaction agent is anhydrous hydrogen chloride.

13. A method in accordance with Claim 11 wherein the step of treating the reaction mixture with the liquefaction agent is carried out under a pressure between about 1.2 to about 40 atmospheres.

14. A method in accordance with Claim 9 which further comprises the step of adding a non-protic diluent as well as a liquefaction agent in step III.

15. A method in accordance with Claim 14 wherein the nonprotic diluent is 1,2-dichloroethane.

16. A method in accordance with Claim 9 which further comprises the step of removing catalyst residues by treating the reaction mixture with a decomplexing agent.

17. A method in accordance with claim 1 or claim 9, wherein the monomer system comprises p-phenoxybenzoyl chloride.

* * * * *

UNITED STATES PATENT AND TRADEMARK OFFICE
CERTIFICATE OF CORRECTION

PATENT NO. : 4,665,151

DATED : Robert Reamey

INVENTOR(S) :
May 12, 1987

It is certified that error appears in the above-indentified patent and that said Letters Patent is hereby corrected as shown below:

Column 5, line 4, replace "$[cal/cm_3]^{178}$" by --$[cal/cm_3]^{1/2}$--.

Column 5, line 6, replace "$[cal/cm_3]^{178}$" by --$[cal/cm_3]^{1/2}$--.

Column 10, line 33, replace "0°C" by --20°C--.
Column 12:
Claim 1, line 5, replace "halide" by --dihalide--.

Signed and Sealed this

Twenty-fifth Day of January, 1994

Attest:

BRUCE LEHMAN

*Attesting Officer*  *Commissioner of Patents and Trademarks*